United States Patent
Kim et al.

(10) Patent No.: US 10,937,237 B1
(45) Date of Patent: Mar. 2, 2021

(54) RECONSTRUCTING THREE-DIMENSIONAL SCENES USING MULTI-VIEW CYCLE PROJECTION

(71) Applicant: Adobe Inc., San Jose, CA (US)

(72) Inventors: Vladimir Kim, Seattle, WA (US); Pierre-alain Langlois, Paris (FR); Matthew Fisher, San Francisco, CA (US); Bryan Russell, San Francisco, CA (US); Oliver Wang, Seattle, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/816,080

(22) Filed: Mar. 11, 2020

(51) Int. Cl.
  *G06T 17/20* (2006.01)
  *G06T 7/73* (2017.01)
  *G06T 7/77* (2017.01)
  *G06T 19/20* (2011.01)
  *G06N 3/04* (2006.01)

(52) U.S. Cl.
  CPC ......... *G06T 17/205* (2013.01); *G06N 3/0472* (2013.01); *G06T 7/75* (2017.01); *G06T 7/77* (2017.01); *G06T 19/20* (2013.01); *G06T 2207/20084* (2013.01)

(58) Field of Classification Search
  CPC .......... G06T 17/205; G06T 7/75; G06T 7/77; G06T 19/20; G06N 3/0472
  See application file for complete search history.

(56) References Cited

PUBLICATIONS

Kulkarni at al., Canonical Surface Mapping via Geometric Cycle Consistency, in International Conference on Computer Vision (ICCV), Aug. 15, 2019, available at https://arxiv.org/pdf/1907.10043.pdf.
Lin et al, Photometric Mesh Optimization for Video-Aligned 3D Object Reconstruction, in Computer Vision and Pattern Recognition, Mar. 20, 2019, available at https://arxiv.org/pdf/1903.08642.pdf.
Snavely, Photo Tourism: Exploring Photo Collections in 3D, ACM Transactions on Graphics, Jul. 2006, available at https://doi.org/10.1145/1141911.1141964.

(Continued)

*Primary Examiner* — Todd Buttram
(74) *Attorney, Agent, or Firm* — Keller Jolley Preece

(57) ABSTRACT

Methods, systems, and non-transitory computer readable storage media are disclosed for reconstructing three-dimensional object meshes from two-dimensional images of objects using multi-view cycle projection. For example, the disclosed system can determine a multi-view cycle projection loss across a plurality of images of an object via an estimated three-dimensional object mesh of the object. For example, the disclosed system uses a pixel mapping neural network to project a sampled pixel location across a plurality of images of an object and via a three-dimensional mesh representing the object. The disclosed system determines a multi-view cycle consistency loss based on a difference between the sampled pixel location and a cycle projection of the sampled pixel location and uses the loss to update the pixel mapping neural network, a latent vector representing the object, or a shape generation neural network that uses the latent vector to generate the object mesh.

20 Claims, 12 Drawing Sheets

(56) References Cited

PUBLICATIONS

Furukawa et al., Accurate, Dense, and Robust Multi-View Stereopsis, in Proceedings / CVPR, IEEE Computer Society Conference on Computer Vision and Pattern Recognition, IEEE, Jun. 2007, available at https://www.researchgate.net/publication/221364612_Accurate_Dense_and_Robust_Multi-View_Stereopsis.
Groueix et al., AtlasNet: A Papier-Mâché Approach to Learning 3D Surface Generation, in Computer Vision and Pattern Recognition, Jul. 20, 2018, available at https://arxiv.org/pdf/1802.05384.pdf.
Kanazawa et al., Learning Category-Specific Mesh Reconstruction from Image Collections, in the European Conference on Computer Vision (ECCV), 2018.

US 10,937,237 B1

RECONSTRUCTING THREE-DIMENSIONAL SCENES USING MULTI-VIEW CYCLE PROJECTION

BACKGROUND

Improvements to digital image capturing and processing technologies have led to significant advancements in the field of digital object detection and reconstruction. For instance, some digital imaging systems utilize image processing techniques to enhance various computing environments including educational applications, medical applications, commercial applications, and entertainment applications. For example, digital imaging systems can process digital images or video of real-life objects to reconstruct the objects as digital three-dimensional geometry. Reconstructing real-life objects within digital environments allows users to view and/or interact with the reconstructed models via computing devices.

Accurately detecting object models from images or video of real-life objects, however, can be a difficult task. Some conventional image processing systems reconstruct objects by using an input image with known camera poses by optimizing a photometric loss determined from the input image. These conventional systems often fail to learn accurate models for mapping images to three-dimensional reconstructions. Indeed, utilizing a photometric loss from a particular viewpoint often fails to generate an accurate reconstruction mapping of an object portrayed in a digital image. Moreover, conventional systems using a photometric loss from a single viewpoint have historically operated with regard to known, canonical objects. In other words, conventional lack flexibility to apply to objects without known shapes. Thus, conventional systems often lack flexibility to apply to new, unknown objects or topologies.

Some conventional image processing systems reconstruct objects by computing point clouds representing objects detected in one or more images and then constructing meshes from the point clouds. The use of point clouds often produces inaccurate meshes, because constructing a mesh from a point cloud can result in an overly-smoothed, blob-like, or merged mesh that erases important details from the object or combines multiple objects into a single mesh. Additionally, the conventional systems that use point clouds often produce inaccurate results when at least part of an object is occluded due to noise in depth data and possible holes that appear. These conventional systems may attempt to reduce the inaccuracies in the mesh by increasing the number of points in a point cloud corresponding to an object, but this increases the amount of computing resources needed to process the point cloud and generate the mesh while still suffering from some inaccuracies.

SUMMARY

One or more embodiments provide benefits and/or solve one or more of the foregoing or other problems in the art with systems, methods, and non-transitory computer readable storage media that utilize neural networks to reconstruct three-dimensional scenes from digital images or digital video of real-life objects using multi-view cycle projection. To illustrate, the disclosed systems can determine a multi-view cycle consistency loss across a plurality of digital images of an object via an estimated three-dimensional object mesh of the object. For example, in one or more embodiments, the disclosed systems use a pixel mapping neural network to predict a coordinate within a surface mapping space (e.g., a UV space) from a sampled pixel location of a first image. The disclosed systems can then determine a three-dimensional coordinate on a three-dimensional object mesh and project the three-dimensional coordinate onto a second digital image of the object. The disclosed systems can use the projected coordinate from the second digital image to project the coordinate back onto the first image via the three-dimensional object mesh. The disclosed systems can then modify parameters associated with the pixel mapping neural network (and/or a surface generation neural network) to minimize the loss based on the difference between the sampled pixel location and the multi-view cycle projection. In this manner, the disclosed systems can improve the accuracy and efficiency of computing devices that reconstruct three-dimensional meshes from digital images or video portraying objects.

Additional features and advantages of one or more embodiments of the present disclosure will be set forth in the description below.

BRIEF DESCRIPTION OF THE DRAWINGS

Various embodiments will be described and explained with additional specificity and detail through the use of the accompanying drawings in which.

DETAILED DESCRIPTION

Figure 1:
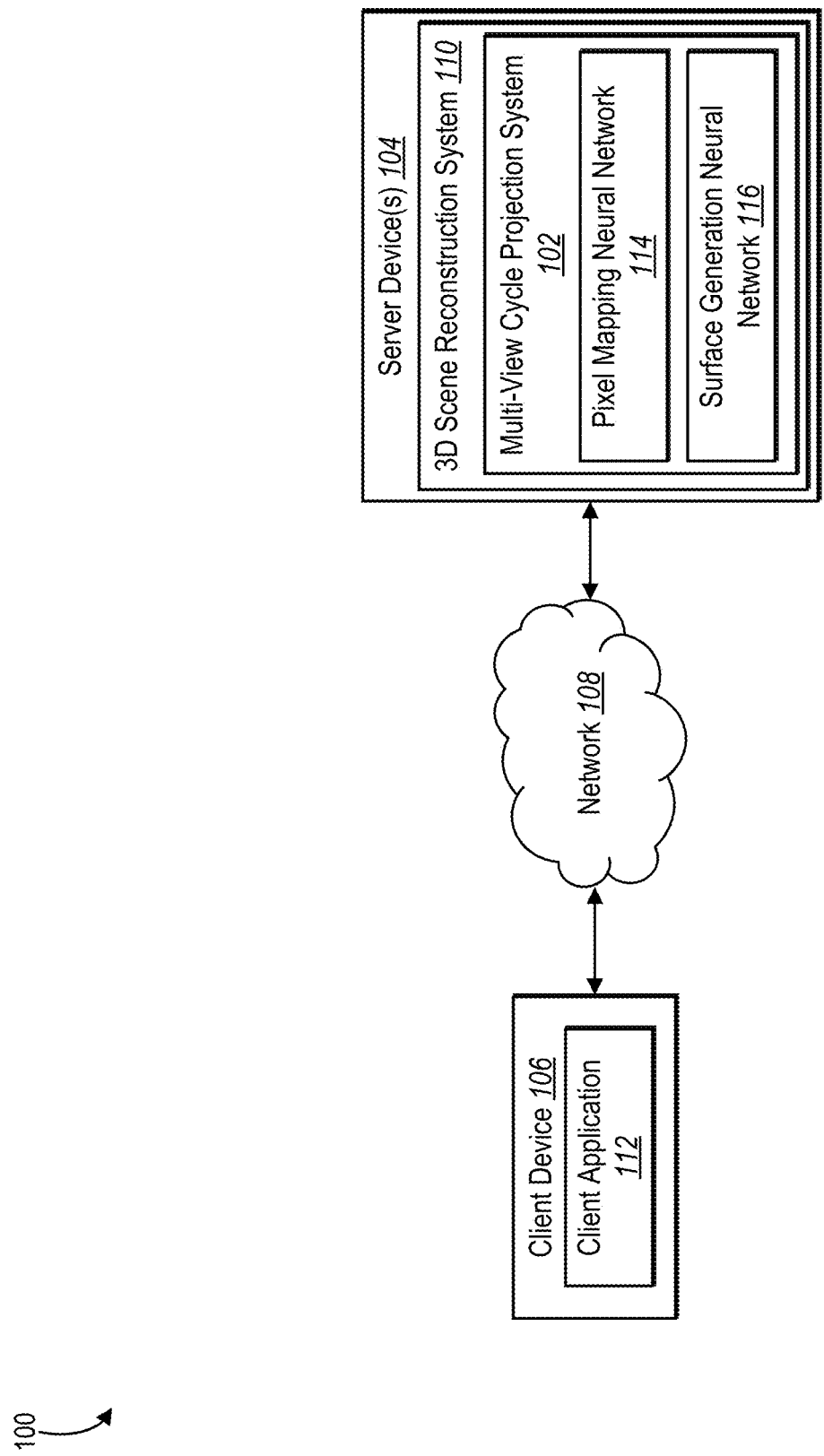
FIG. 1 illustrates an example system in which a multi-view cycle projection system can operate in accordance with one or more implementations.

One or more embodiments of the present disclosure include a multi-view cycle projection system that utilizes neural networks to perform multi-view cycle projection across a plurality of two-dimensional images and an estimated three-dimensional object mesh of an object. In particular, the multi-view cycle projection system (or simply "cycle projection system") can determine a multi-view cycle consistency loss based on a difference between a sampled pixel location of a first image of the object and a cycle projection pixel on the first image. For instance, the cycle projection system can determine the cycle projection pixel by predicting corresponding locations on an estimated three-dimensional object mesh and a second image of the object and then cycling back to the first image. The cycle projection system can use the multi-view cycle consistency loss to improve the estimated three-dimensional object mesh by optimizing the loss (e.g., by reducing the loss) over a pixel mapping neural network that predicts surface mapping coordinates from the two-dimensional images. Additionally, the cycle projection system can also optimize (e.g., reduce) the multi-view cycle consistency loss over an object encoder neural network and/or surface generation neural network to generate an enhanced three-dimensional object mesh.

As mentioned, the cycle projection system can use a pixel mapping neural network to predict a surface mapping coordinate from a sampled pixel location of a first image of an object. Specifically, in one or more embodiments, the cycle projection system can use a pixel mapping neural network to predict a coordinate within a surface mapping space (e.g., UV space) from the sampled pixel location based on a location of the pixel relative to the object within the first image. The cycle projection system can further use the predicted surface mapping coordinate to determine a corresponding location on a surface of an estimated three-dimensional object mesh representing the object.

According to one or more embodiments, the cycle projection system can use a surface generation neural network to generate the estimated three-dimensional object mesh. In particular, the cycle projection system can utilize an image encoder neural network (such as a feed forward neural network) to generate a latent vector of an object portrayed in a digital image. The cycle projection system can then apply the surface generation neural network (as a decoder) to the latent vector to generate the estimated three-dimensional object mesh.

The cycle projection system can generate the estimated three-dimensional object mesh and determine a corresponding location on the surface of the resulting three-dimensional object mesh from the predicted surface mapping coordinate. For example, the cycle projection system can utilize the surface generation neural network to map (u,v) coordinates (generated from the pixel mapping neural network) to the three-dimensional object mesh (determined from the latent vector representation of the object). Accordingly, the surface generation neural network can generate a three-dimensional object mesh and project the the sampled pixel location to a three-dimensional coordinate of the three-dimensional object mesh.

The cycle projection system can also project the three-dimensional coordinate from the estimated three-dimensional object mesh onto a second image of the object. Specifically, the cycle projection system can identify a second image of the object that includes a different perspective of the object relative to the first image (e.g., based on a change in a camera pose capturing the object). The cycle projection system can use information about the camera pose from the second image to project the three-dimensional coordinate from the estimated three-dimensional object mesh onto a pixel of the second image.

After projecting the sampled pixel location of the first image to a pixel of the second image via the estimated three-dimensional object mesh, the cycle projection system can perform similar operations to determine a projected pixel location back onto the first image from the second image. For example, the cycle projection system can determine a new predicted surface mapping coordinate from the pixel of the second image using the pixel mapping neural network and a corresponding three-dimensional coordinate on the estimated three-dimensional object mesh. The cycle projection system can then project the new three-dimensional coordinate onto the first image using camera pose information for the first image to obtain a second pixel location (also referred to herein as a cycle projection) on the first image.

As mentioned above, the cycle projection system can then determine a multi-view cycle consistency loss across the first image, the second image, and the estimated three-dimensional object mesh to improve surface mapping predictions and mesh generation. For example, in one or more embodiments, the cycle projection system can determine the multi-view cycle consistency loss based on a pixel distance between the original, sampled pixel location and the second pixel location (i.e., the cycle projection) of the first image. Because the multi-view cycle consistency loss can result based on inaccuracies in the pixel mapping neural network and/or the estimated three-dimensional object mesh, the cycle projection system can use the loss to improve the pixel mapping neural network and/or the object mesh. In one or more embodiments, the cycle projection system can modify one or more parameters of the pixel mapping neural network and/or a latent vector used by the surface generation neural network to reduce the multi-view cycle consistency loss and improve the accuracy of the cycle projection system.

The disclosed cycle projection system can provide a number of advantages over conventional systems. For example, the cycle projection system can improve the accuracy relative to conventional systems that render three-dimensional models from two-dimensional scenes. To illustrate, with regard to conventional systems that utilize an image to determine a photometric loss, the cycle projection system can more accurately generate three-dimensional meshes by determining and utilizing a multi-view cycle consistency loss that reflects views from multiple different images. Indeed, by minimizing a pixel distance between an initial pixel and a projected pixel from another digital image, the cycle projection system can generate enhanced three-dimensional meshes that more accurately reflect input images.

In addition, the cycle projection system can also improve flexibility relative to conventional systems. Indeed, as discussed above, the cycle projection system can modify an object encoder neural network and/or surface generation neural network to more accurately generate latent vectors and parameters for learning and predicting three-dimensional meshes. Thus, the cycle projection system can flexibly modify the resulting shape to align with multiple views. Moreover, the cycle projection system can learn to more accurately project from surface mapping coordinates to three-dimensional coordinates. Accordingly, the cycle projection system can more flexibly apply to accurately generated enhanced three-dimensional meshes, even without known, canonical shapes.

Furthermore, in contrast to conventional systems that generate three-dimensional models from point clouds, the cycle projection system uses a multi-view cycle projection process that results in more accurate representation of objects detected from two-dimensional images and alignment with the objects in the two-dimensional images. Specifically, using multi-view cycle projection that incorporates a pixel mapping neural network (and a surface generation neural network) to reduce a multi-view cycle consistency loss across a plurality of images of an object detects finer details that are often missed by conventional systems that use point clouds. Additionally, by directly learning a mesh of an object or scene from images, in contrast to first converting to a point cloud representation as in the conventional systems, the cycle projection system can accurately detect and mesh objects even when portions of the objects are occluded by foreground elements.

In addition to improving accuracy, the cycle projection system can improve the efficiency of computing devices rendering three-dimensional models from two-dimensional scenes. In particular, by optimizing (e.g., reducing) a multi-view cycle consistency loss over a pixel mapping neural network (and/or a latent vector that a surface generation neural network uses to estimate a three-dimensional object mesh), the cycle projection system can incorporate detailed object information into the mesh. To illustrate, because the cycle projection system uses a multi-view cycle consistency loss to improve parameters of a neural network and/or a latent vector for estimating an object mesh, the cycle projection system can more quickly and accurately generate an accurate object mesh with fewer computing resources (e.g., by handling fewer data points) than conventional systems that use unstructured point clouds that are then converted to meshes.

As illustrated by the foregoing discussion, the present disclosure utilizes a variety of terms to describe features and advantages of the cycle projection system. Additional detail is now provided regarding the meaning of such terms. For example, as used herein, the term "image" refers to a two-dimensional digital image. Specifically, an image can include a digital image of a scene including one or more objects (e.g., real-world objects). In one or more embodiments, an image can include a single digital image frame of a digital video (e.g., a digital video can include a plurality of sequential digital image frames of a scene).

As used herein, the term "neural network" refers to a computer algorithm that can be tuned (e.g., trained) based on inputs to approximate unknown functions. In particular, a neural network can include a machine-learning model that utilizes algorithms to learn from, and make predictions on, known data by analyzing the known data to learn to generate outputs that reflect patterns and attributes of the known data. For instance, a neural network can include, but is not limited to, a convolutional neural network, a recurrent neural network, a generative adversarial neural network, a variational auto-encoder, a feed forward neural network, a multi-layer perceptron, or a graph neural network. A neural network learns high-level abstractions in data to generate data-driven predictions or decisions from the known input data.

As used herein, the term "pixel mapping neural network" refers to a neural network that predicts a location in a surface mapping space from a pixel of an image. For example, a pixel mapping neural network can include a convolutional neural network trained to predict (u,v) coordinates for a pixel of a digital image. Additional detail regarding a pixel mapping neural network is provided below.

Moreover, as used herein, an "object encoder neural network" refers to a neural network that generates a latent vector representation of an object from a digital image. For example, an object encoder neural network can include a feed forward neural network that generates a feature map representation by processing an object portrayed in a digital image. As used herein, the term "latent vector" (or latent feature vector, feature map, or feature representation) refers to a feature vector of fixed length that represents a two-dimensional image. For instance, a latent vector can include a fixed length representation of one or more of the two-dimensional images of an object portrayed in a digital image.

Additionally, as used herein, the term "surface generation neural network" refers to a neural network that estimates a three-dimensional mesh of an object (e.g., by processing a latent vector representation of the object). For example, a surface generation neural network can include a neural network that reconstructs a mesh from a latent vector constructed from an object encoder neural network. Moreover, a surface generation neural network can also determine a projection between coordinates of a surface mapping space (e.g., UV coordinates) and coordinates of three-dimensional mesh to identify a three-dimensional coordinate corresponding to a pixel of an object portrayed in an image. Because the surface generation neural network can utilize a latent vector, reference to the surface generation neural network and its parameters herein can also include the object encoder neural network and its parameters (e.g., the surface generation neural network can refer to the encoder neural network and the decoder neural network utilized to generate a three-dimensional mesh).

As used herein, the term "three-dimensional object mesh" refers to a digital representation of an object in three dimensions. For example, a three-dimensional object mesh can include a collection of vertices, edges, and faces that define the shape of the object in three dimensions. Specifically, a three-dimensional object mesh typically includes a number of vertices (or individual points) that connect to form edges, which then define of faces representing a surface of the object. A computing device can then render a three-dimensional object mesh by rendering lines for edges and/or the faces.

As used herein, the term "surface mapping space" refers to a coordinate space that includes a two-dimensional representation of a surface of a three-dimensional object. In particular, a surface mapping space can include one or more shapes that correspond to one or more portions of a three-dimensional object mesh. For example, in one or more embodiments, a surface mapping space can include a UV space that includes (u,v) coordinates. Additionally, a surface mapping space can include a grid with values in each coordinate direction from 0 to 1 (e.g., with boundary corners at (0,0), (0,1), (1,0), and (1,1)). The cycle projection system can utilize coordinate data from a surface mapping space to determine locations on a three-dimensional object mesh based on a mapping between coordinates in the surface mapping space and corresponding three-dimensional coordinates in a three-dimensional space.

As used herein, the term "multi-view consistency cycle loss" refers to a loss metric determined across a plurality of images via a three-dimensional object mesh. Specifically, a multi-view consistency cycle loss can be based on a difference between a sampled pixel location and a cycle projection of the sampled pixel location within an image. For example, in one or more embodiments, a multi-view consistency cycle loss can include a squared pixel distance between the sampled pixel location in a first image and a pixel corresponding to a cycle projection of the sampled pixel location in the first image. Additionally, as described in more detail below, a cycle projection can include a projection of a sampled pixel location from a first image of an object to a three-dimensional object mesh of the object, then to a second image of the object, and then back to the first image via the three-dimensional object mesh. In one or more embodiments, a cycle projection can include a projection of a sampled pixel location across three (or more) images of an object.

Additional detail will now be provided regarding the cycle projection system in relation to illustrative figures portraying exemplary implementations. To illustrate, FIG. 1 includes an embodiment of a system environment 100 in which a multi-view cycle projection system 102 (or simply "cycle projection system 102") operates. In particular, the system environment 100 includes server device(s) 104 and a client device 106 in communication via a network 108. Moreover, as shown, the server device(s) 104 include a three-dimensional scene reconstruction system (or "3D scene reconstruction system 110"), which includes the cycle projection system 102. Additionally, the client device 106 can include a client application 112.

As shown in FIG. 1, the server device(s) 104 include the 3D scene reconstruction system 110. The 3D scene reconstruction system 110 can include, or be part of, one or more systems that implement the reconstruction of three-dimensional scenes from digital images. For example, the 3D scene reconstruction system 110 can analyze two-dimensional digital images of scenes including one or more objects to generate three-dimensional models representing the objects. The, 3D scene reconstruction system 110 can then use the three-dimensional models in a variety of applications such as databases of three-dimensional assets, virtual or augmented reality environments, or other environments that utilize three-dimensional models. In one or more embodiments, the 3D scene reconstruction system 110 can provide reconstructed three-dimensional models to another system such as a system at the server device(s) 104 or a third-party system.

In connection with implementing three-dimensional environments using reconstructed three-dimensional models, the 3D scene reconstruction system 110 can receive digital images from the client device 106 via the network 108 to use in identifying objects. For example, the client device 106 can capture, or otherwise obtain, digital images of a real-world scene that includes one or more objects. In one or more embodiments, the client device 106 can include an image capture device that captures digital images or digital video (e.g., with corresponding camera poses). The client device 106 can then provide the digital images (e.g., with camera poses) to the 3D scene reconstruction system 110 (e.g., using the client application 112) via the network 108.

In response to receiving the data from the client device 106, the 3D scene reconstruction system 110 can provide the received data to the cycle projection system 102 for detecting one or more objects in the received data and rendering the object(s) as three-dimensional meshes. For example, the cycle projection system 102 can perform multi-view cycle projection on two or more images having different perspectives of an object. To illustrate, the cycle projection system 102 can use a pixel mapping neural network 114, an object encoder neural network, and/or surface generation neural network 116 to process sampled pixel locations from a first image of the object and determine projections of the sampled pixel locations on a second image of the object via an estimated three-dimensional object mesh. The cycle projection system 102 can then use the pixel mapping neural network 114, an object encoder neural network, and/or the surface generation neural network 116 to process the projections on the sampled pixel locations and determine projections back onto the first image via the estimated three-dimensional object mesh.

After determining a multi-view cycle projection across a plurality of images of an object, the cycle projection system 102 can use a multi-view cycle consistency loss to improve the pixel mapping neural network 114 and/or the surface generation neural network 116 (that itself can include the object encoder neural network). In particular, the cycle projection system 102 can determine a loss based on the difference (e.g., pixel distance) between an original sampled pixel location and a multi-view cycle projection within a single image. The cycle projection system 102 can then use the loss to update parameters of the pixel mapping neural network 114, the object encoder neural network (to modify the latent vector of the object), and/or the surface generation neural network 116. Moreover, by utilizing the updated parameters, the cycle projection system 102 can generate an enhanced three-dimensional object mesh that more accurately reflects the digital images.

In response to the cycle projection system 102 performing processes for generating a three-dimensional object mesh representing an object detected in a digital image, the 3D scene reconstruction system 110 can provide the object mesh to the client device 106 via the network 108. According to one or more embodiments, the 3D scene reconstruction system 110 provides the object mesh to the client device 106 for display within the client application 112 on a display device of the client device 106. Additionally, the 3D scene reconstruction system 110 can perform additional operations on the object mesh prior to providing the object mesh to the client device 106, such as by applying modifiers to the object mesh (e.g., smoothing the object mesh), texturing the object mesh, coloring the object mesh, or inserting the object mesh into a three-dimensional environment. In one or more additional embodiments, the 3D scene reconstruction system 110 can store the object mesh in a database of three-dimensional models for later use.

In one or more embodiments, the server device(s) 104 include a variety of computing devices, including those described below with reference to FIG. 6. For example, the server device(s) 104 can include one or more servers for storing and processing data associated with digital image analysis and three-dimensional imaging applications. The server device(s) 104 can also include a plurality of computing devices in communication with each other, such as in a distributed storage environment. Furthermore, the server device(s) 104 can include devices and/or components in connection with one or more neural network(s) (e.g., the pixel mapping neural network 114 and/or a surface generation neural network) and training data for training the neural network(s). In some embodiments, the server device(s) 104 comprise a content server. The server device(s) 104 can also comprise an application server, a communication server, a web-hosting server, a social networking server, a digital content campaign server, or a digital communication management server.

As mentioned, the server device(s) 104 can include components associated with neural networks and training data for training one or more neural networks. In one or more embodiments, the server device(s) 104 (e.g., the cycle projection system 102 or another system) train the pixel mapping neural network 114, the object encoder neural network, and/or the surface generation neural network 116. The server device(s) 104 can also train the neural network(s) using previously generated or labeled training data such three-dimensional models generated for objects captured in digital images (e.g., objects derived from the models). In addition to utilizing one or more training datasets, the server device(s) 104 can utilize a verification dataset and a testing dataset for verifying and testing training of the neural network(s), respectively.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 6. Furthermore, although not shown in FIG. 1, the client device 106 can be operated by a user (e.g., a user included in, or associated with, the system environment 100) to perform a variety of functions. In particular, the client device 106 can perform functions such as, but not limited to, accessing, viewing, and interacting with a variety of digital content (e.g., digital images, digital video, three-dimensional imaging environments, virtual/augmented reality environments). The client device 106 can also perform functions for generating, capturing, or accessing data to provide to the 3D scene reconstruction system 110 and the cycle projection system 102 in connection with virtual/augmented reality environments. For example, the client device 106 can communicate with the server device(s) 104 via the network 108 to provide information associated with digital images, digital video, or three-dimensional environments. Although FIG. 1 illustrates the system environment 100 with a single client device 106, the system environment 100 can include a different number of client devices.

Additionally, as shown in FIG. 1, the system environment 100 includes the network 108. The network 108 can enable communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 6.

Although FIG. 1 illustrates the server device(s) 104 and the client device 106 communicating via the network 108, the various components of the cycle projection system 102 can communicate and/or interact via other methods (e.g., the server device(s) 104 and the client device 106 can communicate directly). Furthermore, although FIG. 1 illustrates the cycle projection system 102 being implemented by a particular component and/or device within the system environment 100, the cycle projection system 102 can be implemented, in whole or in part, by other computing devices and/or components in the system environment 100 (e.g., the client device 106). Additionally, the pixel mapping neural network 114 and/or the surface generation neural network 116 may be implemented at the server device(s) 104 or at one or more other server devices or systems.

Figure 2:
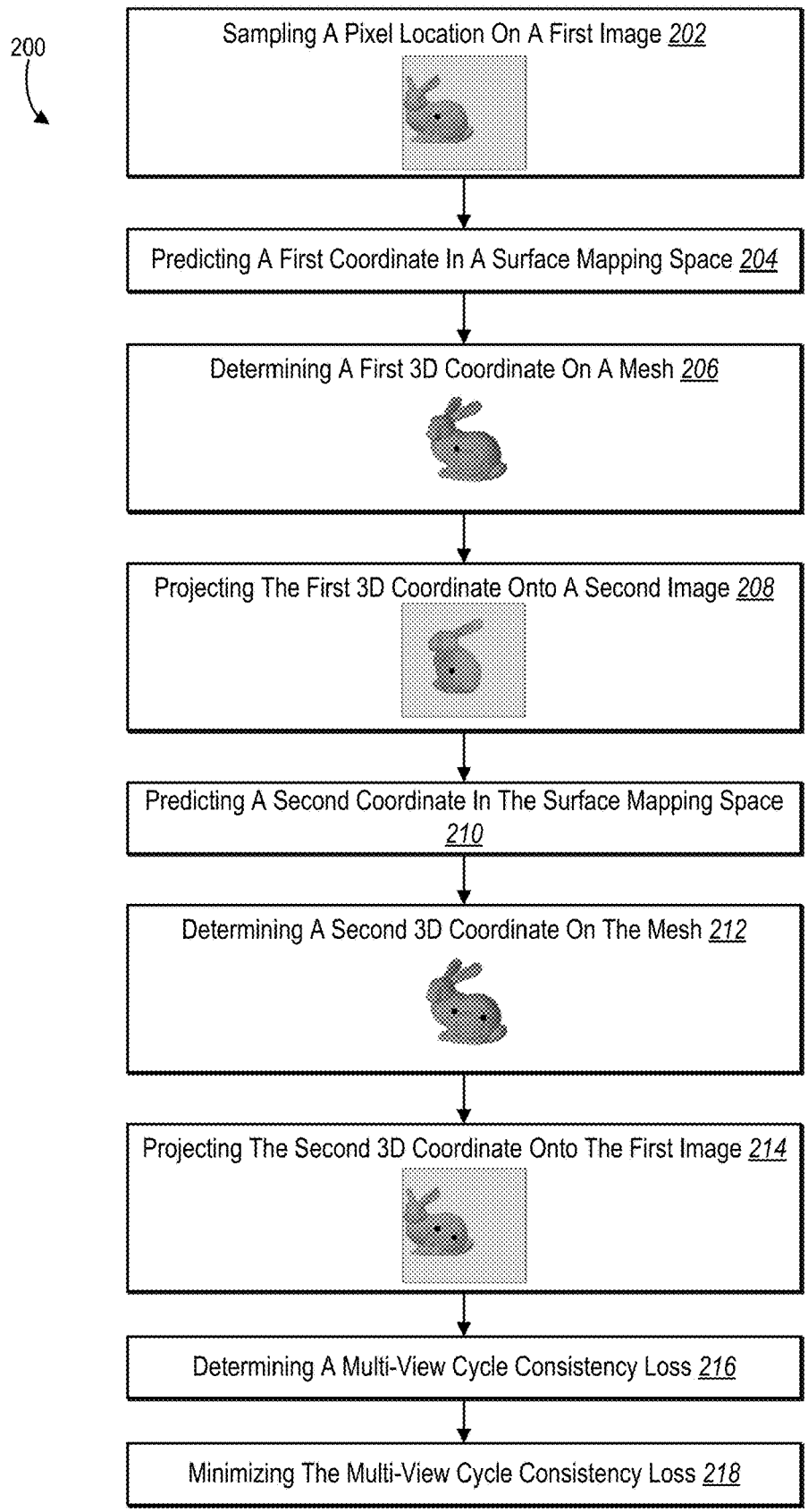
FIG. 2 illustrates a diagram of an overview of a process for using multi-view cycle projection to determine a three-dimensional object mesh in accordance with one or more implementations.

As mentioned above, the cycle projection system 102 can accurately reconstruct three-dimensional object meshes from two-dimensional digital images using a pixel mapping neural network and a surface generation neural network. FIG. 2 illustrates an overview of a process for generating/updating a three-dimensional object mesh using multi-view cycle projection across a plurality of digital images. Specifically, FIG. 2 illustrates that the cycle projection system 102 can project sampled pixel locations across a plurality of digital images and an estimated three-dimensional object mesh to determine a multi-view cycle consistency loss and then use the determined loss to improve object reconstruction.

In one or more embodiments, as shown in FIG. 2, the cycle projection system 102 performs a series of acts 200 to determine a multi-view cycle projection across a plurality of images. In particular, the series of acts 200 can include an act 202 of sampling a pixel location on a first image of an object. For example, the cycle projection system 102 can randomly sample pixel locations within the first image. Alternatively, the cycle projection system 102 can use a specific sampling pattern (e.g., sequential) to sample pixel locations within the first image.

According to one or more embodiments, the cycle projection system 102 can utilize one or more object recognition techniques (e.g., machine-learning or deep learning methods such as region proposal neural networks, edge detection, feature detection, manual labeling) to detect an object within an image. The cycle projection system 102 can then sample pixel locations within a boundary of the detected object. Accordingly, the cycle projection system 102 can sample pixel locations within the boundary of the object without sampling pixel locations outside the boundary of the object.

FIG. 2 illustrates that the series of acts 200 includes an act 204 of predicting a first coordinate in a surface mapping space from the sampled pixel location. Specifically, the cycle projection system 102 uses a pixel mapping neural network to analyze the sampled pixel location to predict a corresponding location in a surface mapping space such as UV space. In one or more embodiments, the cycle projection system 102 predicts the coordinate in the surface mapping space by using the first image as input to the pixel mapping neural network, which can then output a unit vector per pixel representing a point on the surface of a sphere. The cycle projection system 102 can convert the surface point to a (u, v) coordinate in the surface mapping space. For instance, the cycle projection system 102 can use a convolutional neural network architecture (e.g., U-Net) to predict the surface mapping points, as described in "Canonical Surface Mapping via Geometric Cycle Consistency" by Nilesh Kulkarni, Abhinav Gupta, and Shubham Tulsiani in ICCV 2019, which is incorporated herein.

As shown in FIG. 2, the series of acts 200 also includes a step 206 of determining a first three-dimensional coordinate on a three-dimensional object mesh corresponding to the object. In particular, the cycle projection system 102 can determine a three-dimensional coordinate for a three-dimensional object mesh by converting the surface mapping coordinate to three-dimensional space. More specifically, the cycle projection system 102 can map or assign each coordinate in a two-dimensional (e.g., (u, v)) space to a three-dimensional coordinate corresponding to a surface of a three-dimensional object in three-dimensional space. The cycle projection system 102 can then use this mapping to convert a specific surface mapping coordinate to a specific three-dimensional coordinate.

In one or more embodiments, the cycle projection system 102 uses a surface generation neural network (that includes an object encoder neural network) to generate an estimated three-dimensional object mesh. For example, the cycle projection system 102 can utilize an object encoder neural network to process the object portrayed in the digital image and generate a latent vector. In one or more embodiments, the cycle projection system 102 utilizes ResNet as the object encoder neural network to generate the latent vector.

As mentioned above, the latent vector can include information that the surface generation neural network that learns the surface representation of a three-dimensional mesh directly. In particular, the surface generation neural network can approximate a target surface by mapping one or more 2D shapes (e.g., a set of squares) to the surface of a 3D shape. The surface generation neural network can jointly learn a parameterization and an embedding of the shape. In other words, the surface generation neural network can transform one or more 2D surfaces (e.g., in a UV space) to a surface, covering it in a way similar to placing strips of paper on a shape to form a papier-mâché. The parameters of the transformations come both from the learned weights of the neural network and the learned representation of the shape.

For example, the cycle projection system 102 can initialize the surface generation neural network with a base feature representation (e.g., a base object mesh) corresponding to a class of the object. The surface generation neural network can modify a surface mapping corresponding to the base feature representation based on the latent vector representing the object. The cycle projection system 102 can also use the surface mapping coordinate predicted for the pixel location on the first image to determine a corresponding three-dimensional coordinate on the object mesh estimated from the latent vector.

In some embodiments, the cycle projection system 102 utilizes multilayer perceptrons with rectified linear unit nonlinearities for the architecture of the surface generation neural network. In addition to the latent feature vector, the surface generation neural network can take sampled 2D points as input together with a base feature representation and predict one or more surface points. In particular, the surface generation neural network can concatenate 2D points to shape features of the base feature representation to generate input to the surface generation neural network. By processing this input (and the latent vector) through learned parameters of its internal layers (trained on ground truth points clouds or meshes utilizing a Chamfer loss), the surface generation neural network can generate predicted three-dimensional points. Moreover, the surface generation neural network can connect three-dimensional coordinates to generate a mesh. To illustrate, in some embodiments, the cycle projection system 102 utilizes the approach described in "AtlasNet: A Papier-Mâché Approach to Learning 3D Surface Generation" by Thibault Groueix, Matthew Fisher, Vladimir Kim, Bryan Russell, and Mathieu Aubry in CVPR 2018, which is incorporated herein by reference.

FIG. 2 further illustrates that the series of acts 200 includes an act 208 of projecting the first three-dimensional coordinate onto a second image. To illustrate, the cycle projection system 102 can identify perspective information associated with the second image based on a camera pose for the second image. The cycle projection system 102 can use the perspective information to determine a pixel location in the second image for each portion of the object (e.g., based on where the three-dimensional coordinates are located on the surface of the object). In one or more embodiments, the second image has a different perspective of the object than the first image such as based on a different camera pose. The cycle projection system 102 can then project the first three-dimensional coordinate onto the second image based on the location of the first three-dimensional coordinate on the surface of the object and the corresponding pixel location in the second image.

FIG. 2 illustrates that the series of acts 200 further includes an act 210 of predicting a second coordinate in the surface mapping space. In particular, the cycle projection system 102 can predict the second coordinate in the surface mapping space based on the projected pixel location in the second image. For example, the cycle projection system 102 can use the pixel mapping neural network to analyze the pixel location projected onto the second image from the three-dimensional object mesh and determine a second predicted coordinate in the surface mapping space. To illustrate, the cycle projection system 102 can use the pixel mapping neural network to generate a (u, v) coordinate in the surface mapping space. According to one or more embodiments, the second coordinate in the surface mapping space may be different than the first coordinate in the surface mapping space due to inaccuracies in parameters of the pixel mapping neural network, in the latent vector that the surface generation neural network uses to generate the estimated three-dimensional object mesh, and/or in the parameters of the surface generation neural network.

FIG. 2 further shows that the series of acts 200 includes a step 212 of determining a second three-dimensional coordinate on the three-dimensional object mesh. Specifically, the cycle projection system 102 can determine the second three-dimensional coordinate by converting the second surface mapping coordinate to three-dimensional space. The cycle projection system 102 can use the previously determined mapping/assignment between coordinates in the surface mapping space to the three-dimensional space to determine the second three-dimensional coordinate. The second three-dimensional coordinate corresponds to a second location on the surface of the three-dimensional object mesh. Because the first and second predicted coordinates in the surface mapping space may be different, the first and second three-dimensional coordinates in three-dimensional space may also be different.

FIG. 2 also illustrates that the series of acts 200 includes a step 214 of projecting the second three-dimensional coordinate onto the first image. In one or more embodiments, after determining the second three-dimensional coordinate, the cycle projection system 102 determines a corresponding projection of the second three-dimensional coordinate on the first image based on a camera pose associated with the first image. As mentioned above, the first image and the second image can have different perspectives due to having different camera poses. The cycle projection system 102 can project the second three-dimensional coordinate onto the first image based on the location of the second three-dimensional coordinate on the surface of the object and a corresponding location in the first image. To illustrate, the cycle projection system 102 can project the second three-dimensional coordinate onto the corresponding pixel location by utilizing information about the camera pose associated with the first image.

As illustrated in FIG. 2, the series of acts 200 also includes an act 216 of determining a multi-view cycle consistency loss from the multi-view cycle projection process. In particular, the cycle projection system 102 can determine a loss based on a difference between the sampled pixel location from the first image and the pixel location projected onto the first image via the second image. For example, in one or more embodiments, the cycle projection system 102 determines the multi-view cycle consistency loss by calculating a squared pixel distance (or other measure of loss) between the sampled pixel location and the projected pixel location. The loss can represent an error in the multi-view cycle projection process based on parameters of the pixel mapping neural network, the latent vector for estimating the three-dimensional object mesh, parameters of the surface generation neural network, information about the camera poses, or other data associated with projecting a sampled pixel across at least two images and a three-dimensional object mesh of an object.

FIG. 2 illustrates that the series of acts 200 includes an act 218 of minimizing the multi-view cycle consistency loss. In one or more embodiments, the cycle projection system 102 uses the multi-view cycle consistency loss to improve reproduction of the three-dimensional object mesh of the object. For instance, the cycle projection system 102 can improve the accuracy of predictions of the pixel mapping neural network by updating at least one parameter of the pixel mapping neural network based on the loss. To illustrate, the cycle projection system 102 can utilize back-propagation techniques to modify one or more weights or values of the pixel mapping neural network in a way that reduces the multi-view cycle consistency loss. The cycle projection system 102 can perform any number of iterations of performing the process illustrated in FIG. 2 and updating the parameters of the pixel mapping neural network until the multi-view cycle consistency loss is within a tolerance threshold. In some instances, the cycle projection system 102 can update the parameter(s) of the trained pixel mapping neural network until the multi-view cycle consistency loss has a zero value.

In one or more embodiments, the cycle projection system 102 can train the pixel mapping neural network for each set of object reconstruction process based on images of the object. Accordingly, the cycle projection system 102 can train the pixel mapping neural network to predict surface mapping coordinates for a set of images by optimizing parameters of the pixel mapping neural network based on the multi-view cycle consistency loss for the images. When using the pixel mapping neural network to predict surface mapping coordinates for a new set of images (e.g., for reconstructing a new object), the cycle projection system 102 can re-train the pixel mapping neural network, or train a new instance of the pixel mapping neural network, based on a multi-view cycle consistency loss for the new set of images. In short, the cycle projection system 102 can train the pixel mapping neural network with the object of minimizing pixel distance by optimizing over the parameters of the neural network(s).

Additionally, the cycle projection system 102 can update parameters of the object encoder neural network and/or the surface generation neural network based on the multi-view cycle consistency loss. In particular, the cycle projection system 102 can modify internal parameters of the object encoder network and utilize the modified parameters to generate a modified latent vector representing the object. Similarly, the cycle projection system 102 can modify internal parameters of the surface generation neural network and utilize the modified parameters to generate an enhanced three-dimensional mesh. By updating the latent vector (or other parameters) of the surface generation neural network to reduce the loss, the cycle projection system 102 can improve an accuracy of the estimated three-dimensional object mesh, resulting in more accurate mapping of pixel locations to the object mesh and more accurate projection onto two-dimensional images.

In one or more embodiments, the cycle projection system 102 optimizes the multi-view cycle consistency loss over the pixel mapping neural network, the object encoder neural network (e.g., the latent vector), and the surface generation neural network. For example, the cycle projection system 102 can control for the latent vector/surface generation neural network while updating parameters of the pixel mapping neural network. Additionally, the cycle projection system 102 can control for the parameters of the pixel mapping neural network when updating parameters of the object encoder neural network (e.g., the latent vector) and/or the parameters of the surface generation neural network. Furthermore, the cycle projection system 102 can alternate between updating parameters of the pixel mapping neural network and updating the latent vector/parameters of the surface generation neural network until the cycle projection system 102 obtains a multi-view cycle consistency loss that meets a threshold value (e.g., based on a maximum acceptable distance between the sampled pixel location and the projected pixel location.

In one or more additional embodiments, the multi-view cycle consistency loss can represent a combined error based on a plurality of sampled pixel locations and corresponding projected pixel locations. Specifically, the multi-view cycle consistency loss can be based on the multi-view cycle consistency loss associated with a plurality of separate pixel locations and their corresponding projected pixel locations (e.g., by combining the separate multi-view cycle consistency losses). The cycle projection system 102 can then optimize the multi-view cycle consistency loss for a plurality of sampled pixel locations and projected pixel locations by updating the pixel mapping neural network, surface generation neural network, and/or the latent vector.

FIGS. 3A-3G illustrate diagrams of a process of determining a multi-view cycle projection across a plurality of digital images. In particular, FIGS. 3A-3G illustrate projecting a sampled pixel location in a cycle across a plurality of images via a three-dimensional object mesh. FIGS. 3A-3G illustrate that the multi-view cycle consistency loss is based on the resulting difference between the sampled pixel location and the cycle projection across the plurality of images.

Figure 3A:
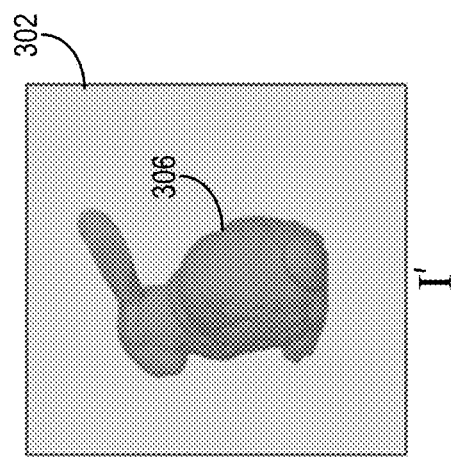
FIGS. 3A-3G illustrate diagrams of images and a mesh associated with an object in a process for using multi-view cycle projection to determine a three-dimensional object mesh in accordance with one or more implementations.
Figure 3A:
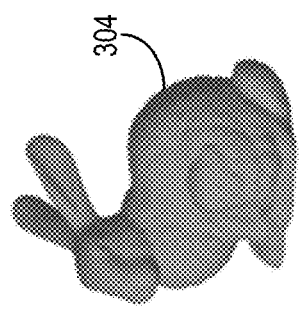
Figure 3A:
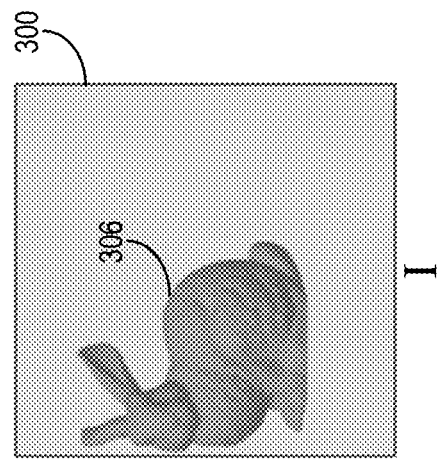

FIG. 3A illustrates a first image 300, a second image 302, and a three-dimensional object mesh 304 associated with an object 306. Specifically, the first image 300 (also represented as I in FIGS. 3A-3G) includes a first view of the object 306, and the second image 302 (also represented as I' in FIGS. 3A-3G) includes a second view of the object 306. For example, the first image 300 can include the first view of the object 306 captured based on a first camera pose. Additionally, the second image 302 can include the second view of the object 306 captured based on a second camera pose that may be from a different viewing angle of the object 306 than the first camera pose.

Furthermore, as illustrated, the three-dimensional object mesh 304 includes an estimated mesh representing the object 306. The cycle projection system 102 can generate the three-dimensional object mesh 304 from the first image 300 and the second image 302 using a surface generation neural network. For example, the cycle projection system 102 can represent the object 306 as a latent vector (e.g., utilizing an object encoder neural network). The surface generation neural network can decode the latent vector to generate the estimated mesh of the object 306 (e.g., as described in "AtlasNet: A Papier-Mâché Approach to Learning 3D Surface Generation"). To illustrate, the surface generation neural network can output the decoded latent vector as one or more surfaces in a three-dimensional mesh. In at least some implementations, the surface generation neural network initializes the three-dimensional object mesh 304 based on initial parameters that the cycle projection system 102 can update to improve the accuracy of the three-dimensional object mesh 304, as described above.

Figure 3B:
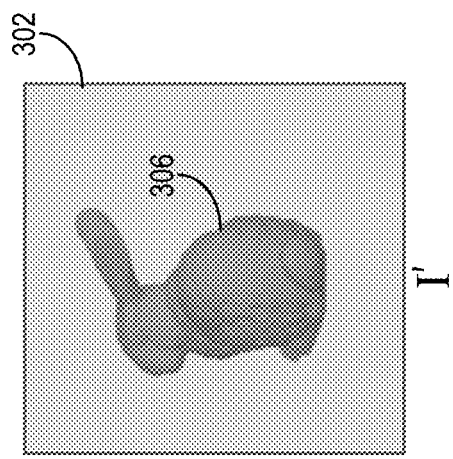
Figure 3B:
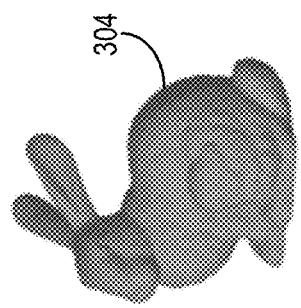
Figure 3B:
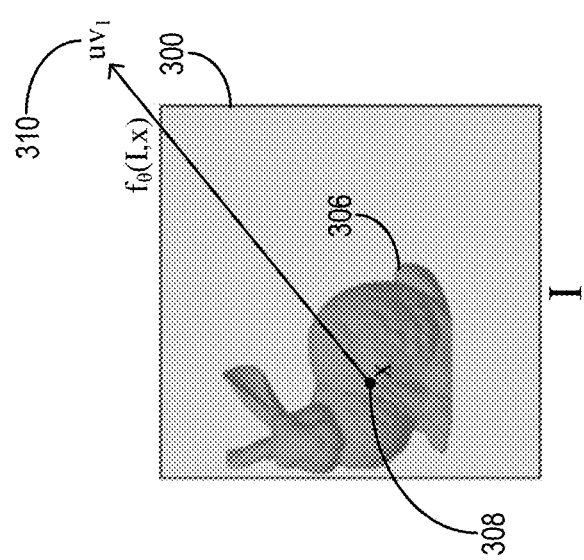

To determine a multi-view cycle consistency loss across at least two images, FIG. 3B illustrates that the cycle projection system 102 first samples a pixel location 308 (also represented as "x") on the object. The cycle projection system 102 can sample the pixel location 308 using random sampling, uniform sampling, or other sampling techniques. The cycle projection system 102 can analyze the pixel location 308 using a pixel mapping neural network to predict a first surface mapping coordinate 310 in a surface mapping space. The first surface mapping coordinate 310 can be a two-dimensional coordinate (e.g., in a unit square) within the UV space that maps each coordinate to a three-dimensional coordinate corresponding to an object surface in three-dimensional space. Specifically, FIG. 3B illustrates that the cycle projection system 102 applies the pixel mapping neural network to the pixel location 308 in the first image 300 to obtain the first surface mapping coordinate 310, where $f_\theta$ represents the pixel mapping neural network, I represents the first image 300, x represents the pixel location 308, and $uv_1$ represents the first surface mapping coordinate 310.

Figure 3C:
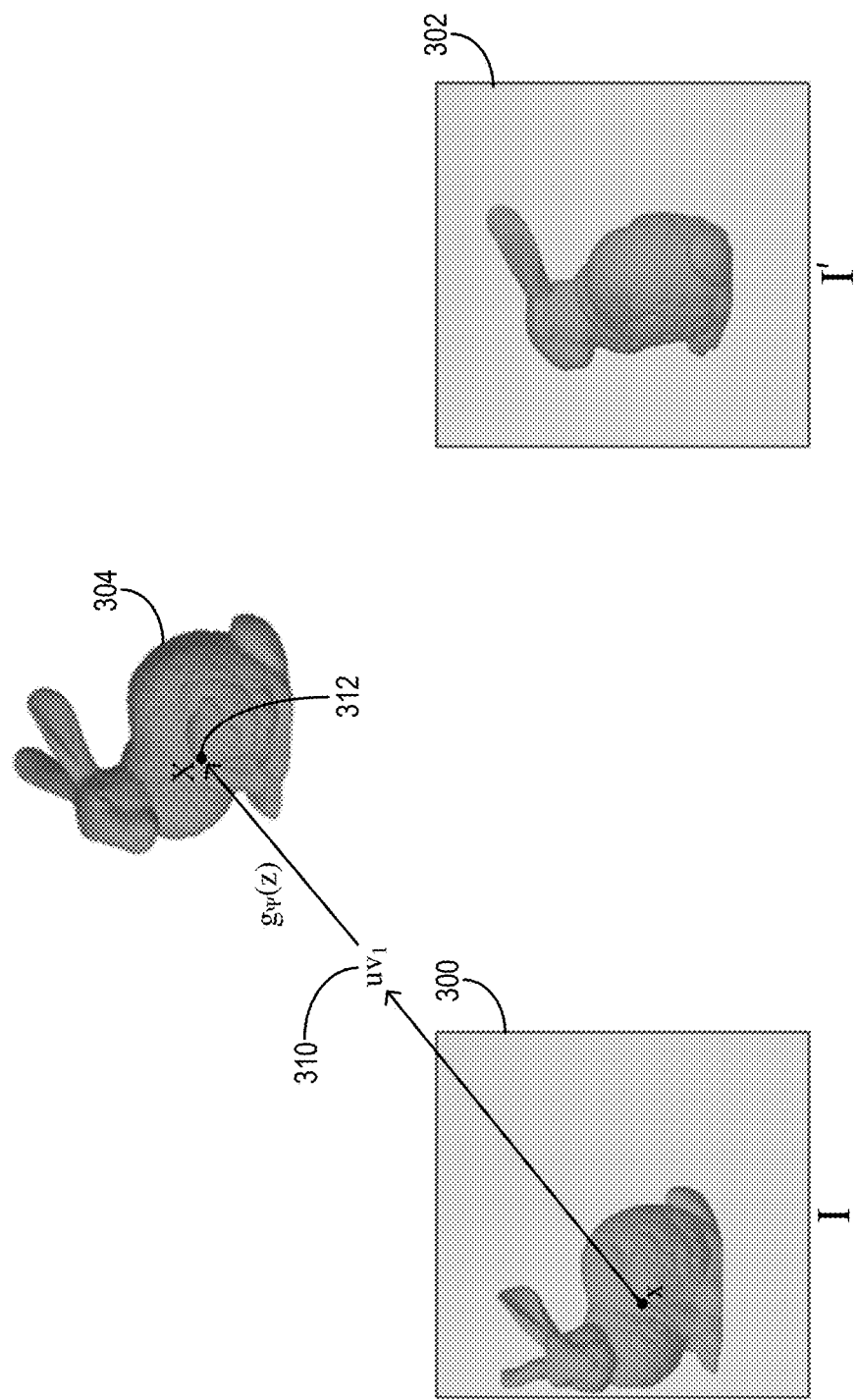

After predicting the first surface mapping coordinate 310 associated with the sampled pixel location 308 from the first image 300, FIG. 3C illustrates that the cycle projection system 102 can then determine a first three-dimensional coordinate 312 based on the first surface mapping coordinate 310. In particular, FIG. 3C illustrates that the cycle projection system 102 uses the first surface mapping coordinate 310 to determine a corresponding location on the surface of the three-dimensional object mesh 304. In one or more embodiments, the cycle projection system 102 can use a mapping between the two-dimensional surface mapping space and surface points on the three-dimensional object mesh 304 to determine the location on the surface. The cycle projection system 102 can then determine the first three-dimensional coordinate 312 based on a position of the three-dimensional object mesh 304 in a three-dimensional space.

In addition, as mentioned, the cycle projection system 102 can generate the three-dimensional object mesh 304 using a latent code representation of the object 306 (generated via an object encoder neural network). FIG. 3C illustrates that the cycle projection system 102 can apply a surface generation neural network to a latent vector (generated utilizing an object encoder neural network) based on the first image 300 and/or the second image 302 to generate the three-dimensional object mesh 304, where $g_\psi$ represents the surface generation neural network, z represents the latent vector, and X represents the first three-dimensional coordinate 312. Accordingly, $gp_\psi(z)$ represents the surface generation neural network decoding the latent vector for the object 306 of the first image 300 and the second image 302.

Figure 3D:
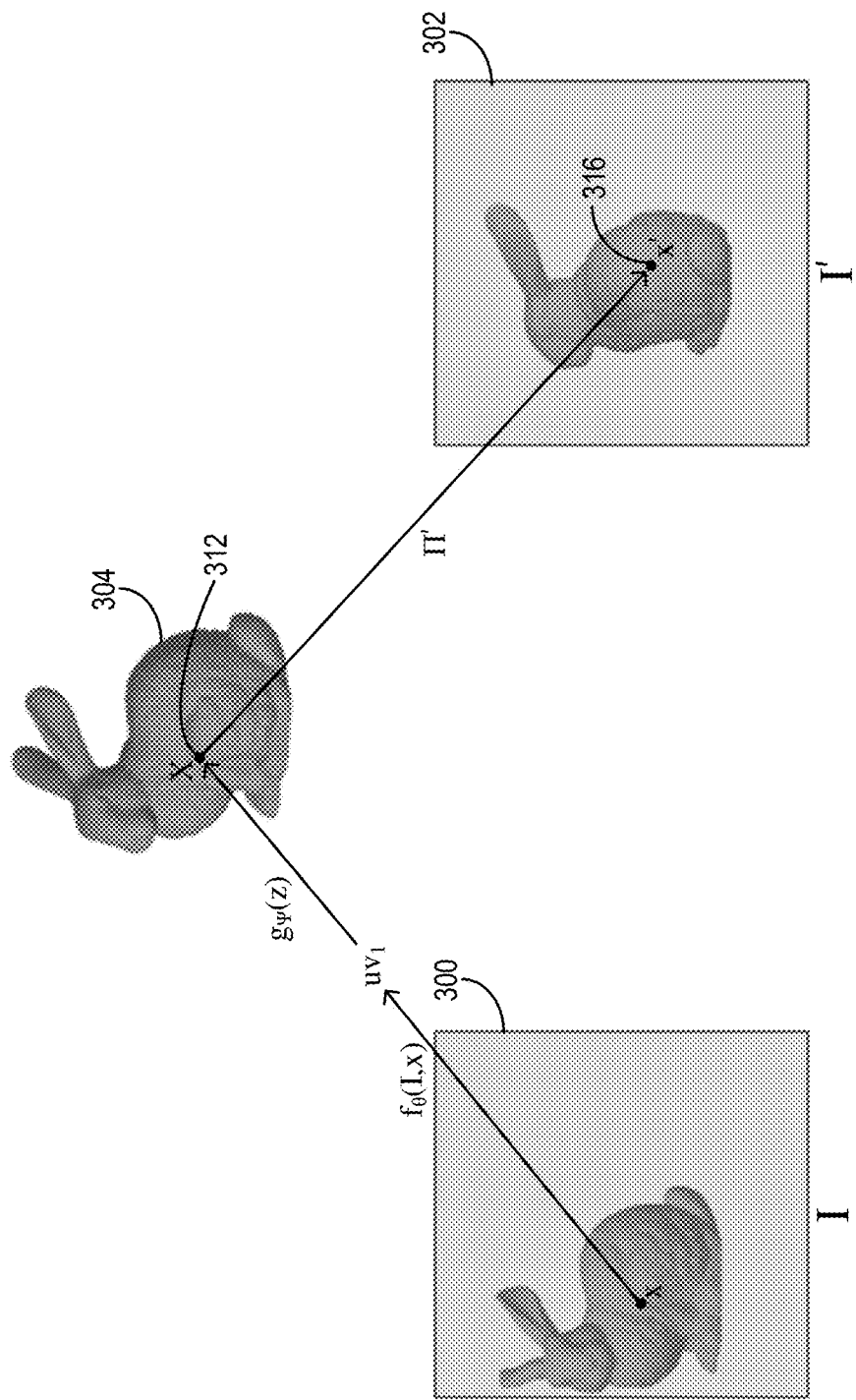

The cycle projection system 102 can then project the first three-dimensional coordinate 312 onto the second image 302. In particular, FIG. 3D illustrates that the cycle projection system 102 can determine a projected pixel location 316 on the second image 302 by converting the first three-dimensional coordinate 312 to a two-dimensional space of the second image 302 based on a perspective of the second image 302. Specifically, the cycle projection system 102 can use information about a camera pose associated with the second image 302 to determine the projected pixel location 316. For instance, FIG. 3D shows that the cycle projection system 102 determines a function Π' based on a camera pose for the second image 302 and then uses the function Π' to determine a location x' including two-dimensional coordinates as the projected pixel location 316 based on the perspective associated with the function Π'.

Figure 3E:
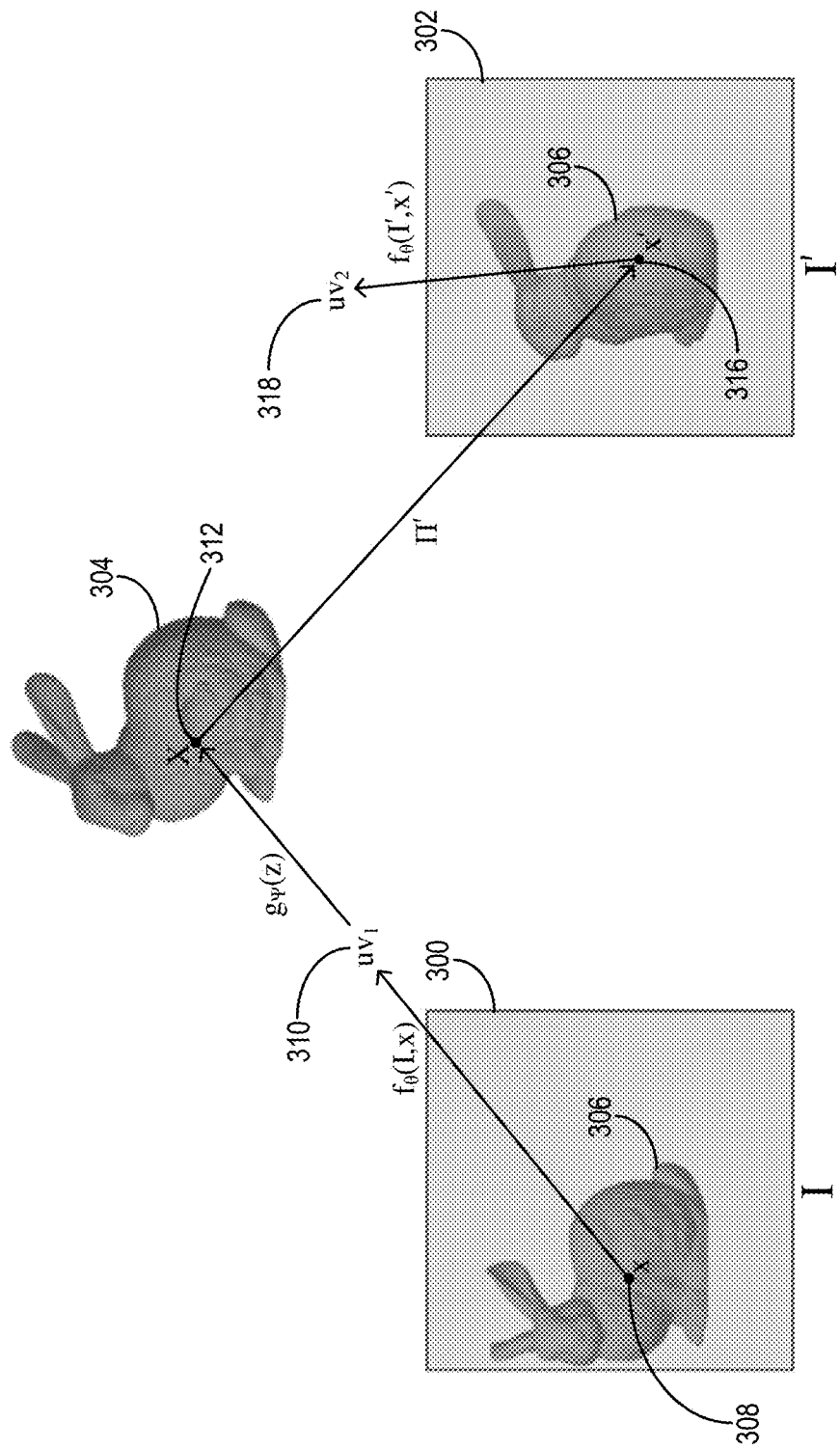

After determining the projected pixel location 316 on the second image 302, the cycle projection system 102 can predict a second surface mapping coordinate 318, as shown in FIG. 3E. The cycle projection system 102 can use the pixel mapping neural network to predict the second surface mapping coordinate 318 from the projected pixel location 316 on the second image 302. Specifically, FIG. 3E illustrates that the cycle projection system 102 uses the pixel mapping neural network to predict the second surface mapping coordinate 318, where the pixel mapping neural network $f_\theta$ analyzes the projected pixel location x' of image I' to generate a predicted coordinate $uv_2$ in the surface mapping space.

In one or more embodiments, the second surface mapping coordinate 318 may have different coordinate values than the first surface mapping coordinate 310. For example, if the first three-dimensional coordinate 312 does not exactly align with the sampled pixel location 308 (e.g., based on inaccuracies in the pixel mapping neural network or the three-dimensional object mesh 304), the projected pixel location 316 in the second image 302 may not be at the same position of the object 306 as the sampled pixel location 308 in the first image 300. The pixel mapping neural network may thus generate the second surface mapping coordinate 318 with different values than the first surface mapping coordinate 310.

Figure 3F:
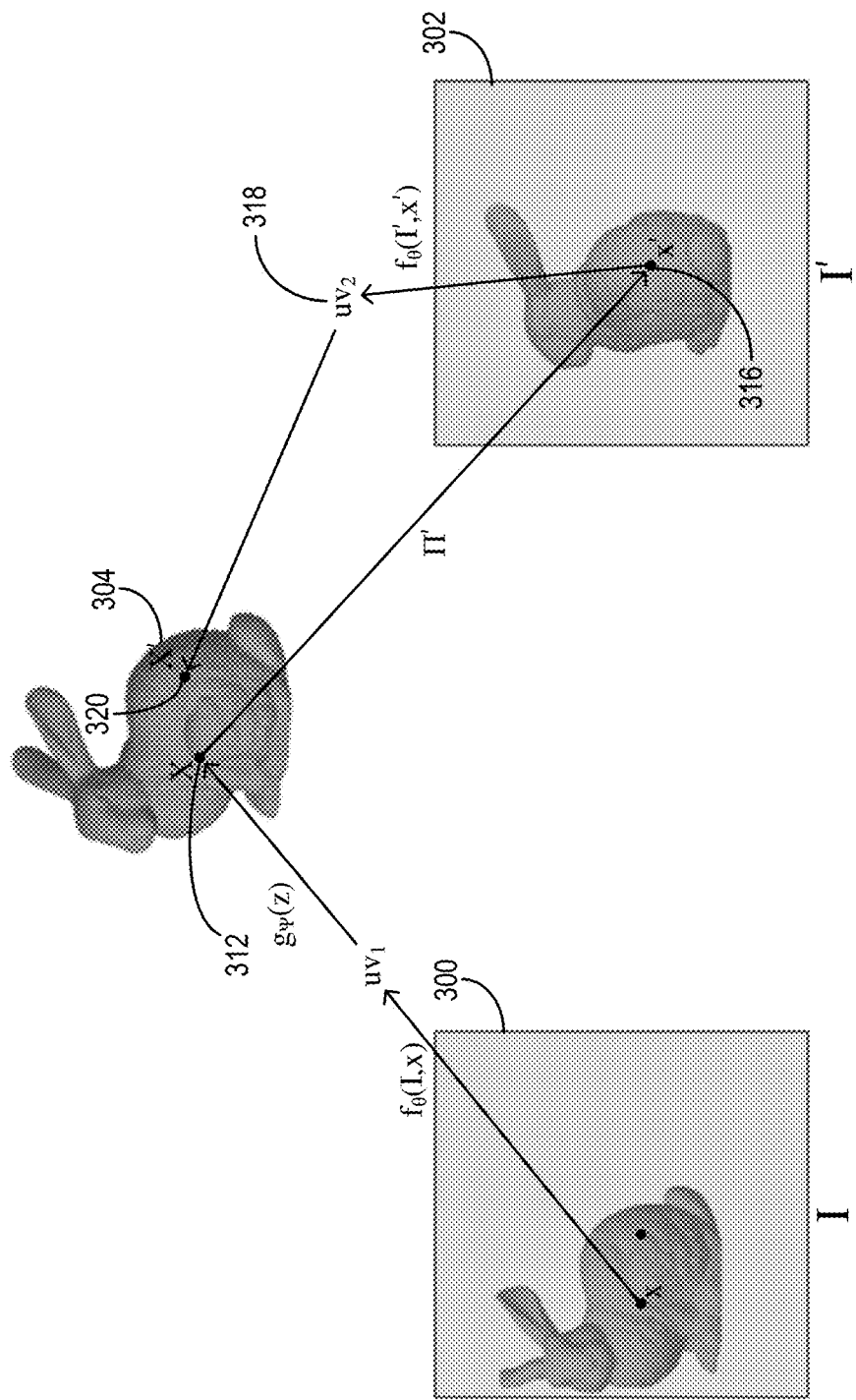

After generating the second surface mapping coordinate 318, the cycle projection system 102 can determine a second three-dimensional coordinate 320 on the three-dimensional object mesh 304, as illustrated in FIG. 3F. Specifically, the cycle projection system 102 can use the same mapping between the surface mapping space and the three-dimensional space that the cycle projection system 102 previously used to determine the first three-dimensional coordinate 312 to determine the second three-dimensional coordinate 320 from the second surface mapping coordinate 318. The cycle projection system 102 can thus determine a correspondence between the projected pixel location 316 in the second image 302 and the second three-dimensional coordinate 320 on the three-dimensional object mesh 304. As illustrated in FIG. 3F, the second three-dimensional coordinate 320 may be in a different position on the surface of the three-dimensional object mesh 304 (e.g., due to the second surface mapping coordinate 318 being different than the first surface mapping coordinate 310 and/or inaccuracies in the three-dimensional object mesh 304).

Figure 3G:
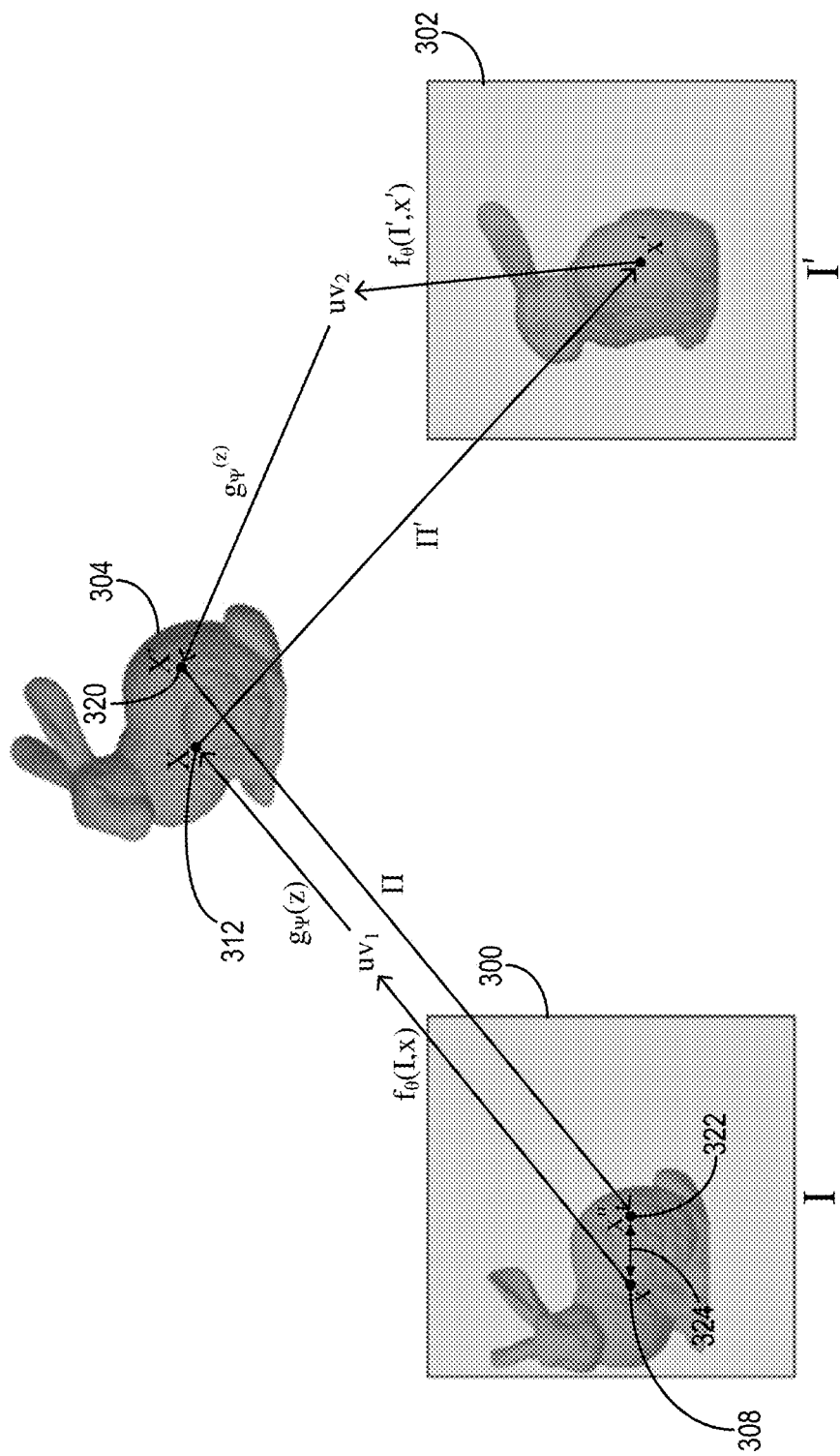

Based on the second three-dimensional coordinate 320, FIG. 3G illustrates that the cycle projection system 102 can then determine a projected pixel location 322 on the first image 300. In particular, the cycle projection system 102 can use information about a camera pose associated with the first image 300 to determine the projected pixel location 322 on the first image 300. For instance, FIG. 3G shows that the cycle projection system 102 determines a function Π based on a camera pose for the first image 300 and then uses the camera pose Π to determine a location x'' including two-dimensional coordinates as the projected pixel location 322 based on the perspective associated with the camera pose Π for the first image 300.

As shown in FIG. 3G, the sampled pixel location 308 and the projected pixel location 322 on the first image 300 may be different. The cycle projection system 102 can use a pixel distance 324 between the sampled pixel location 308 and the projected pixel location 322 to determine the multi-view cycle consistency loss for the first image 300 and the second image 302. As mentioned previously, differences between a sampled pixel location and a projected pixel location (e.g., a cycle projection across a plurality of images) can be based on inaccuracies in the estimation of the three-dimensional object mesh or in parameters of a pixel mapping neural network that predicts surface mapping coordinates from a sampled pixel location of a two-dimensional image. In one or more embodiments, the cycle projection system 102 determines the multi-view cycle consistency loss as the squared pixel distance between a sampled pixel location and a cycle projection (e.g., the square of the pixel distance 324 of FIG. 3G).

The cycle projection system 102 uses the multi-view cycle consistency loss to improve the accuracy of the cycle projection. For example, the cycle projection system 102 can modify one or more parameters of the pixel mapping neural network, update a latent vector representing the object in the images (e.g., by modifying parameters of the object encoder neural network), and/or modify one or more parameters other of the surface generation neural network to reduce the multi-view cycle consistency loss. Reducing the multi-view cycle consistency loss can be a result of reducing the pixel distance between a sampled pixel location and a subsequent cycle projection after modifying the neural network(s) and/or the latent vector. For instance, the cycle projection system 102 can determine an enhanced three-dimensional mesh and new projected pixel location based on the updated neural network(s)/latent vector and then determine a new multi-view cycle consistency loss. The cycle projection system 102 can then use the new multi-view cycle consistency loss to further update the neural network(s)/latent vector. In one or more embodiments, the cycle projection system 102 minimizes $\|x-x"\|$ while optimizing over $\theta$, $z$, and/or $\Psi$.

Although FIGS. 3A-3G illustrate an embodiment of a cycle projection process across two images, the cycle projection system 102 can perform a cycle projection process across more than two images. For example, the cycle projection system 102 can determine a multi-view cycle consistency loss across three images. To illustrate, in an embodiment involving a third image of an object having a third perspective, rather than projecting the second three-dimensional coordinate 320 back onto the first image 300, the cycle projection system 102 can project the second three-dimensional coordinate 320 onto the third image. The cycle projection system 102 can then predict a third surface mapping coordinate from the projection onto the third image, determine a third three-dimensional coordinate on the three-dimensional object mesh 304 based on the third surface mapping coordinate, and then project the third three-dimensional coordinate back onto the first image. The cycle projection system 102 can determine the multi-view cycle consistency loss based on the distance between the sampled pixel location in the first image and the projected location in the first image based on the third three-dimensional coordinate.

In one or more additional embodiments, the cycle projection system 102 can also use the multi-view cycle consistency loss across a plurality of images to recover camera pose information. For example, in some cases the camera pose for one or more images may not be known prior to analyzing the images. Because the cycle projection system 102 can use camera pose information to project a three-dimensional coordinate onto a two-dimensional image, estimating the camera pose information may contribute to multi-view cycle consistency loss. The cycle projection system 102 can thus use the multi-view cycle consistency loss to modify an estimation of a camera pose for an image.

As described in relation to FIGS. 2 and 3A-3G, the cycle projection system 102 can perform operations for determining a multi-view cycle consistency loss across a plurality of images and a three-dimensional object mesh of an object. The operations allow the cycle projection system 102 to accurately reconstruct an object in a three-dimensional space using two-dimensional images. Accordingly, the acts and operations illustrated and described above in relation to FIGS. 2 and 3A-3G can provide the corresponding acts (e.g., structure) for a step for determining a multi-view consistency cycle loss across the first image and the second image using a pixel mapping neural network and an estimated three-dimensional object mesh for the object.

Figure 4:
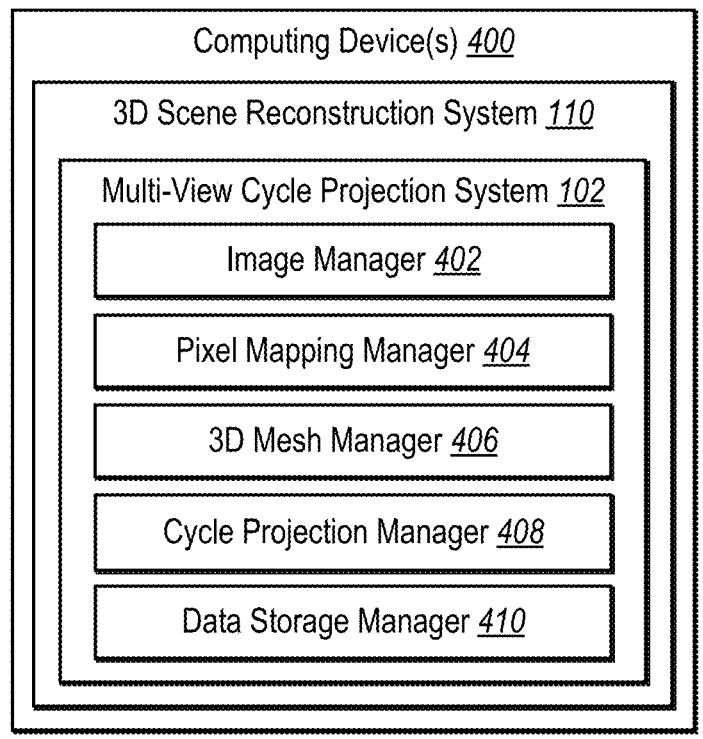
FIG. 4 illustrates a diagram of the multi-view cycle projection system of FIG. 1 in accordance with one or more implementations.

FIG. 4 illustrates a detailed schematic diagram of an embodiment of the multi-view cycle projection system 102 described above. As shown, the cycle projection system 102 can be implemented in a 3D scene reconstruction system 110 on computing device(s) 400 (e.g., a client device and/or server device as described in FIG. 1, and as further described below in relation to FIG. 6. Additionally, the cycle projection system 102 can include, but is not limited to, an image manager 402, a pixel mapping manager 404, a three-dimensional ("3D") mesh manager 406, a cycle projection manager 408, and a data storage manager 410. The cycle projection system 102 can be implemented on any number of computing devices. For example, the cycle projection system 102 can be implemented in a distributed system of server devices for processing digital images and rendering three-dimensional objects. The cycle projection system 102 can also be implemented within one or more additional systems. Alternatively, the cycle projection system 102 can be implemented on a single computing device such as a single client device.

In one or more embodiments, each of the components of the cycle projection system 102 is in communication with other components using any suitable communication technologies. Additionally, the components of the cycle projection system 102 can be in communication with one or more other devices including other computing devices of a user, server devices (e.g., cloud storage devices), licensing servers, or other devices/systems. It will be recognized that although the components of the cycle projection system 102 are shown to be separate in FIG. 4, any of the subcomponents may be combined into fewer components, such as into a single component, or divided into more components as may serve a particular implementation. Furthermore, although the components of FIG. 4 are described in connection with the cycle projection system 102, at least some of the components for performing operations in conjunction with the cycle projection system 102 described herein may be implemented on other devices within the environment.

The components of the cycle projection system 102 can include software, hardware, or both. For example, the components of the cycle projection system 102 can include one or more instructions stored on a computer-readable storage medium and executable by processors of one or more computing devices (e.g., the computing device(s) 400). When executed by the one or more processors, the computer-executable instructions of the cycle projection system 102 can cause the computing device(s) 400 to perform the image processing operations described herein. Alternatively, the components of the cycle projection system 102 can include hardware, such as a special purpose processing device to perform a certain function or group of functions. Additionally, or alternatively, the components of the cycle projection system 102 can include a combination of computer-executable instructions and hardware.

Furthermore, the components of the cycle projection system 102 performing the functions described herein with respect to the cycle projection system 102 may, for example, be implemented as part of a stand-alone application, as a module of an application, as a plug-in for applications, as a library function or functions that may be called by other applications, and/or as a cloud-computing model. Thus, the components of the cycle projection system 102 may be implemented as part of a stand-alone application on a personal computing device or a mobile device. Alternatively, or additionally, the components of the cycle projection system 102 may be implemented in any application that provides three-dimensional image rendering, including, but not limited to ADOBE® DIMENSION®, and ADOBE® CREATIVE CLOUD® software. "ADOBE," "ADOBE DIMENSION," and "CREATIVE CLOUD" are registered trademarks of Adobe in the United States and/or other countries.

As described above, the cycle projection system 102 can include an image manager 402 to facilitate management of digital images for a cycle projection process. For example, the image manager 402 can obtain and store a plurality of digital images of an object. The image manager 402 can also store information about the images including camera pose information or sequence information. The image manager 402 can also store manually entered information associated with the images such as labels or image masks.

The cycle projection system 102 can also include a pixel mapping manager 404 to facilitate the mapping of pixel locations in two-dimensional images and surface mapping coordinates. For example, the pixel mapping manager 404 can utilize, or communicate with, a pixel mapping neural network to generate predictions of coordinates in a surface mapping space based on sampled pixel locations in a plurality of images. Additionally, the pixel mapping manager 404 can store mappings between the surface mapping space and a three-dimensional space including a three-dimensional object mesh.

Additionally, the cycle projection system 102 can include a 3D mesh manager 406 to facilitate management of a three-dimensional object mesh in a three-dimensional space. Specifically, the 3D mesh manager 406 can store a plurality of vertices having three-dimensional coordinates in the three-dimensional space for an object mesh representing an object. Additionally, the 3D mesh manager 406 can store correspondences between the vertices (e.g., edges and/or faces) to provide a structure for the three-dimensional object mesh. The 3D mesh manager 406 can also use a surface generation neural network to generate or modify the three-dimensional object mesh from a latent vector. As mentioned above, the surface generation neural network can include an object encoder neural network that generates the latent vector representation of an object.

The cycle projection system 102 can include a cycle projection manager 408 to perform operations associated with a cycle projection process. For instance, the cycle projection manager 408 can communicate with the image manager 402, the pixel mapping manager 404, and the 3D mesh manager 406 to identify sampled pixel locations and projected pixel locations in an image in a multi-view cycle projection process. The cycle projection manager 408 can then determine one or more multi-view cycle consistency losses based on the sampled pixel locations and projected pixel locations. The cycle projection manager 408 can also communicate with one or more other components of the cycle projection system 102 to modify parameters of the neural network(s) and/or a latent vector based on the multi-view cycle consistency loss(es).

Additionally, the cycle projection system 102 also includes a data storage manager 410 (that comprises a non-transitory computer memory/one or more memory devices) that stores and maintains data associated with reconstructing three-dimensional objects from two-dimensional digital images. For example, the data storage manager 410 can store information associated with images, pixel locations, mappings between coordinate spaces, three-dimensional object meshes, latent vectors, and multi-view cycle consistency losses. The data storage manager 410 can also store information associated with a pixel mapping neural network and/or a surface generation neural network.

Figure 5:
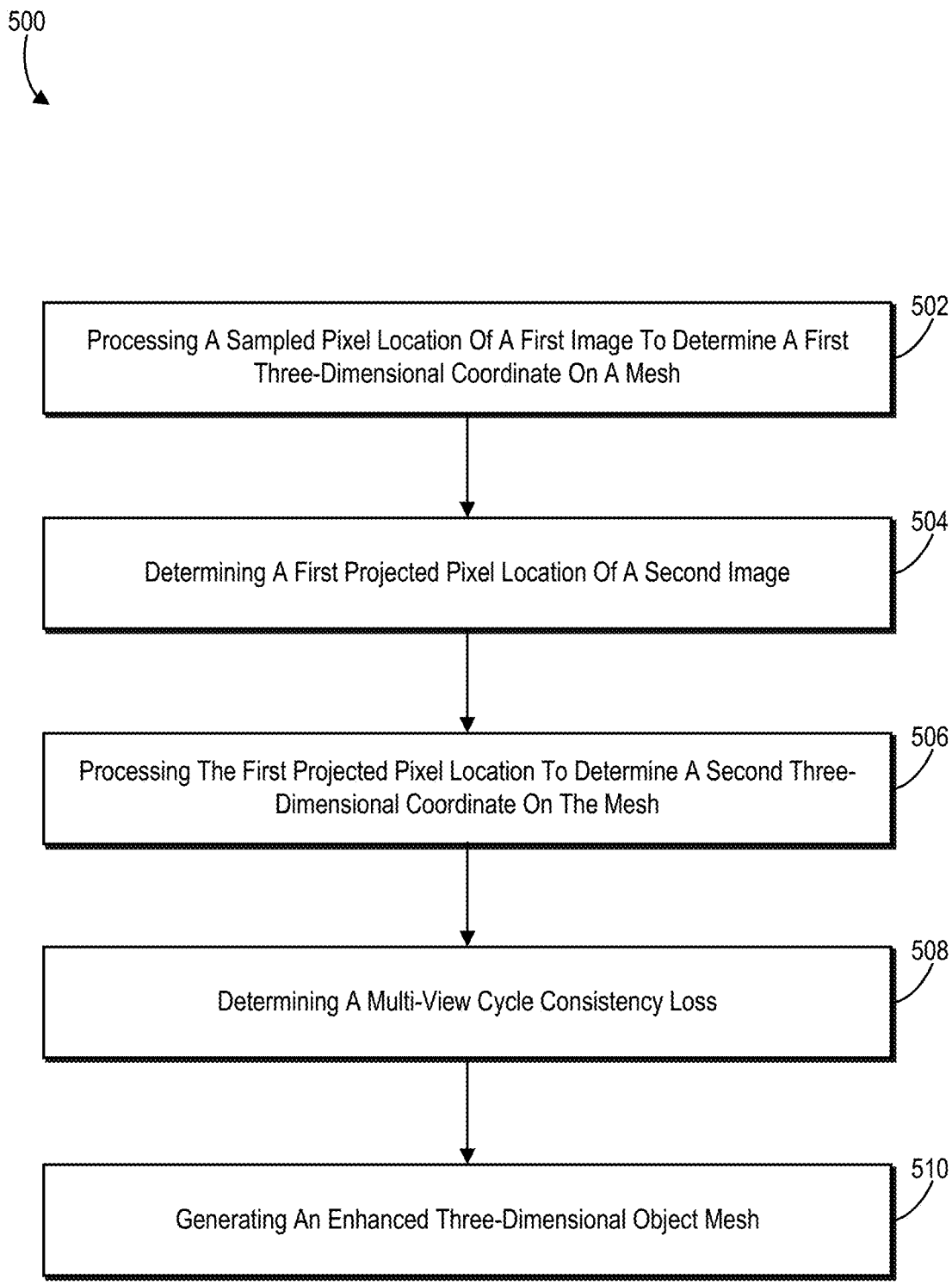
FIG. 5 illustrates a flowchart of a series of acts for using multi-view cycle projection to determine a three-dimensional object mesh in accordance with one or more implementations.

Turning now to FIG. 5, this figure shows a flowchart of a series of acts 500 of performing multi-view cycle projection across a plurality of images of an object. While FIG. 5 illustrates acts according to one embodiment, alternative embodiments may omit, add to, reorder, and/or modify any of the acts shown in FIG. 5. The acts of FIG. 5 can be performed as part of a method. Alternatively, a non-transitory computer readable medium can comprise instructions, that when executed by one or more processors, cause a computing device to perform the acts of FIG. 5. In still further embodiments, a system can perform the acts of FIG. 5.

As shown, the series of acts 500 includes an act 502 of processing a sampled pixel location of a first image to determine a first three-dimensional coordinate on a mesh. For example, act 502 involves processing, using a pixel mapping neural network, a sampled pixel location of a first image comprising a first view of an object to determine a first three-dimensional coordinate on an estimated three-dimensional object mesh corresponding to the object.

Act 502 can involve generating, using the pixel mapping neural network, a first predicted coordinate within a surface mapping space corresponding to the estimated three-dimensional object mesh. Furthermore, act 502 can involve determining the first three-dimensional coordinate on the estimated three-dimensional object mesh from the first predicted coordinate within the surface mapping space. For instance, act 502 can involve generating the estimated three-dimensional object mesh corresponding to the object using a surface generation neural network. Additionally, act 502 can involve mapping the first predicted coordinate to a first three-dimensional coordinate on the estimated three-dimensional object.

The series of acts 500 also includes an act 504 of determining a first projected pixel location of a second image. For example, act 504 involves determining a first projected pixel location of a second image comprising a second view of the object by projecting the first three-dimensional coordinate onto the second image. Act 504 can involve projecting the first three-dimensional coordinate onto the second image by utilizing camera pose information associated with the second image to determine the first projected pixel location of the second image.

Additionally, the series of acts 500 includes an act 506 of processing the first projected pixel location to determine a second three-dimensional coordinate on the mesh. For example, act 506 involves processing, using the pixel mapping pixel mapping neural network, the first projected pixel location of the second image to determine a second three-dimensional coordinate on the estimated three-dimensional object mesh.

Act 506 can involve generating, using the pixel mapping neural network, a second predicted coordinate within the surface mapping space corresponding to the estimated three-dimensional object mesh. Furthermore, act 506 can involve determining the second three-dimensional coordinate on the estimated three-dimensional object mesh from the second predicted coordinate within the surface mapping space. Additionally, act 506 can involve mapping the second predicted coordinate to the second three-dimensional coordinate on the estimated three-dimensional object.

Furthermore, the series of acts 500 includes an act 508 of determining a multi-view cycle consistency loss. For example, act 508 involves determining, using the sampled pixel location of the first image and the second three-dimensional coordinate on the estimated three-dimensional object mesh, a multi-view consistency cycle loss across the first image and the second image.

As part of act 508, or as an additional act, the series of acts 500 can include determining a second projected pixel location of the first image by projecting the second three-dimensional coordinate onto the first image. Act 508 can then include determining the multi-view consistency cycle loss based on the sampled pixel location of the first image and the second projected pixel location of the first image. For example, act 508 can include determining a squared pixel distance between the sampled pixel location of the first image and the second projected pixel location of the first image.

In one or more embodiments, act 508 can also include determining a second projected pixel location of a third image comprising a third view of the object by projecting the second three-dimensional coordinate onto the third image. Act 508 can then include processing, using the pixel mapping neural network, the second projected pixel location of the third image to determine a third three-dimensional coordinate on the estimated three-dimensional object mesh. Act 508 can also include determining a third projected pixel location of the first image by projecting the third three-dimensional coordinate onto the first image. Act 508 can then include determining the multi-view consistency cycle across the first image, the second image, and the third image comprising the third view of the object based on the sampled pixel location of the first image and the third projected pixel location of the first image.

The series of acts 500 also includes an act 510 of generating an enhanced three-dimensional object mesh. For example, act 510 involves, upon modifying one or more parameters of the pixel mapping neural network to reduce the multi-view cycle consistency loss, utilizing the pixel mapping neural network to generate an enhanced three-dimensional object mesh corresponding to the object. Act 510 can also involve generating the enhanced three-dimensional object mesh corresponding to the object based on modifying, in connection with the one or more parameters of the pixel mapping neural network, one or more parameters used by the surface generation neural network to generate the estimated three-dimensional object mesh to reduce the multi-view cycle consistency loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
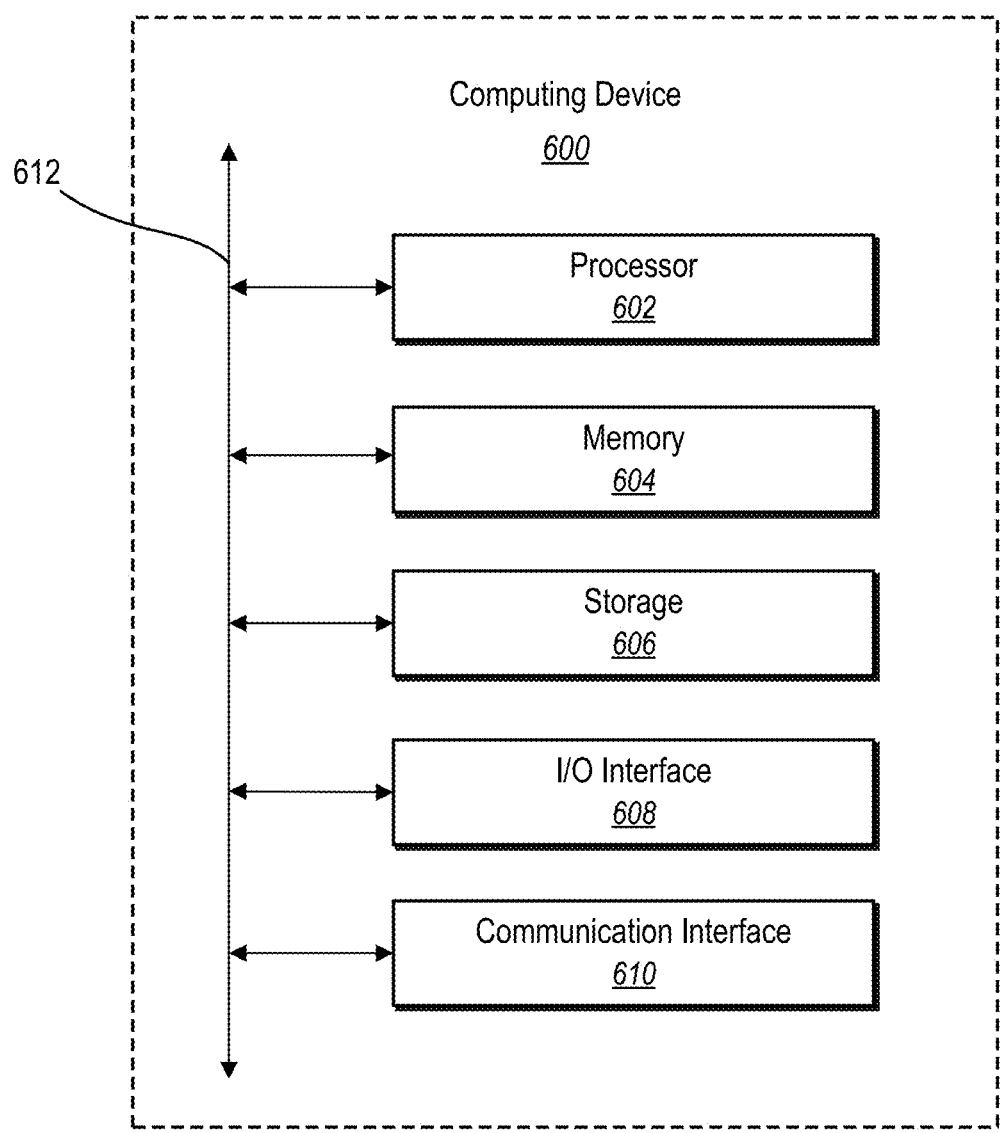
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the system(s) of FIG. 1. As shown by FIG. 6, the computing device 600 can comprise a processor 602, a memory 604, a storage device 606, an I/O interface 608, and a communication interface 610, which may be communicatively coupled by way of a communication infrastructure 612. In certain embodiments, the computing device 600 can include fewer or more components than those shown in FIG. 6. Components of the computing device 600 shown in FIG. 6 will now be described in additional detail.

In one or more embodiments, the processor 602 includes hardware for executing instructions, such as those making up a computer program. As an example, and not by way of limitation, to execute instructions for dynamically modifying workflows, the processor 602 may retrieve (or fetch) the instructions from an internal register, an internal cache, the memory 604, or the storage device 606 and decode and execute them. The memory 604 may be a volatile or non-volatile memory used for storing data, metadata, and programs for execution by the processor(s). The storage device 606 includes storage, such as a hard disk, flash disk drive, or other digital storage device, for storing data or instructions for performing the methods described herein.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example, and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 610 may facilitate communications with various types of wired or wireless networks. The communication interface 610 may also facilitate communications using various communication protocols. The communication infrastructure 612 may also include hardware, software, or both that couples components of the computing device 600 to each other. For example, the communication interface 610 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   process, using a pixel mapping neural network, a sampled pixel location of a first image comprising a first view of an object to determine a first three-dimensional coordinate on an estimated three-dimensional object mesh corresponding to the object;
   determine a first projected pixel location of a second image comprising a second view of the object by projecting the first three-dimensional coordinate onto the second image;
   process, using the pixel mapping neural network, the first projected pixel location of the second image to determine a second three-dimensional coordinate on the estimated three-dimensional object mesh;
   determine, using the sampled pixel location of the first image and the second three-dimensional coordinate on the estimated three-dimensional object mesh, a multi-view consistency cycle loss across the first image and the second image; and
   upon modifying one or more parameters of the pixel mapping neural network to reduce the multi-view cycle consistency loss, utilizing the pixel mapping neural network to generate an enhanced three-dimensional object mesh corresponding to the object.

2. The non-transitory computer readable storage medium as recited in claim 1, wherein the instructions that, when executed by the at least one processor, cause the computing device to determine the multi-view consistency cycle loss by:
   determining a second projected pixel location of the first image by projecting the second three-dimensional coordinate onto the first image; and
   determining the multi-view consistency cycle loss based on the sampled pixel location of the first image and the second projected pixel location of the first image.

3. The non-transitory computer readable storage medium as recited in claim 2, wherein the instructions that, when executed by the at least one processor, cause the computing device to determine the multi-view consistency cycle loss by determining a squared pixel distance between the sampled pixel location of the first image and the second projected pixel location of the first image.

4. The non-transitory computer readable storage medium as recited in claim 1, wherein the instructions that, when executed by the at least one processor, cause the computing device to process the sampled pixel location of the first image by generating, using the pixel mapping neural network, a first predicted coordinate within a surface mapping space corresponding to the estimated three-dimensional object mesh.

5. The non-transitory computer readable storage medium as recited in claim 4, wherein the instructions that, when executed by the at least one processor, cause the computing device to process the sampled pixel location of the first image by determining the first three-dimensional coordinate on the estimated three-dimensional object mesh from the first predicted coordinate within the surface mapping space.

6. The non-transitory computer readable storage medium as recited in claim 5, further comprising instructions that, when executed by the at least one processor, cause the computing device to generate the estimated three-dimensional object mesh corresponding to the object using a surface generation neural network.

7. The non-transitory computer readable storage medium as recited in claim 6, further comprising instructions that, when executed by the at least one processor, cause the computing device to modify, in connection with the one or more parameters of the pixel mapping neural network, one or more parameters used by the surface generation neural network to generate the estimated three-dimensional object mesh to reduce the multi-view cycle consistency loss.

8. The non-transitory computer readable storage medium as recited in claim 1, further comprising instructions that, when executed by the at least one processor, cause the computing device to:
   determine a second projected pixel location of a third image comprising a third view of the object by projecting the second three-dimensional coordinate onto the third image;
   process, using the pixel mapping neural network, the second projected pixel location of the third image to determine a third three-dimensional coordinate on the estimated three-dimensional object mesh; and
   determine a third projected pixel location of the first image by projecting the third three-dimensional coordinate onto the first image.

9. The non-transitory computer readable storage medium as recited in claim 8, wherein the instructions that, when executed by the at least one processor, cause the computing device to determine the multi-view consistency cycle loss further cause the computing device to determine the multi-view consistency cycle across the first image, the second image, and the third image comprising the third view of the object based on the sampled pixel location of the first image and the third projected pixel location of the first image.

10. A system comprising:
    at least one computer memory device comprising a first image comprising a first view of an object a second image comprising a second view of the object; and
    one or more servers configured to cause the system to:
    identify a sampled pixel location of the first image;
    process, using a pixel mapping neural network, the sampled pixel location to generate a first predicted coordinate within a surface mapping space;
    map the first predicted coordinate to a first three-dimensional coordinate on an estimated three-dimensional object mesh of the object;
    determine a first projected pixel location of the second image by projecting the first three-dimensional coordinate onto the second image;
    process, using the pixel mapping neural network, the first projected pixel location of the second image to generate a second predicted coordinate within the surface mapping space;
    map the second predicted coordinate to a second three-dimensional coordinate on the estimated three-dimensional object mesh; and
    determine, using the sampled pixel location of the first image and the second three-dimensional coordinate on the estimated three-dimensional object mesh, a multi-view consistency cycle loss across the first image and the second image.

11. The system as recited in claim 10, wherein the one or more servers are further configured to cause the system to:
    modify one or more parameters of the pixel mapping neural network to reduce the multi-view cycle consistency loss; and
    generate an enhanced three-dimensional object mesh by processing the first image utilizing the one or more parameters of the pixel mapping neural network.

12. The system as recited in claim 10, wherein the one or more servers are further configured to cause the system to generate the estimated three-dimensional object mesh corresponding to the object using a surface generation neural network.

13. The system as recited in claim 12, wherein the one or more servers are further configured to cause the system to modify a latent vector used by the surface generation neural network to generate the estimated three-dimensional object mesh to reduce the multi-view cycle consistency loss.

14. The system as recited in claim 10, wherein the one or more servers are further configured to cause the system to determine the multi-view consistency cycle loss by:

determining a second projected pixel location of the first image by projecting the second three-dimensional coordinate onto the first image; and determining the multi-view consistency cycle loss based on the sampled pixel location of the first image and the second projected pixel location of the first image.

15. The system as recited in claim 14, wherein the one or more servers are further configured to cause the system to determine the multi-view consistency cycle loss by determining a squared pixel distance between the sampled pixel location of the first image and the second projected pixel location of the first image.

16. The system as recited in claim 10, wherein the one or more servers are further configured to cause the system to:

determine a second projected pixel location of a third image comprising a third view of the object by projecting the second three-dimensional coordinate onto the third image;

process, using the pixel mapping neural network, the second projected pixel location of the third image to determine a third three-dimensional coordinate on the estimated three-dimensional object mesh;

determine a third projected pixel location of the first image by projecting the third three-dimensional coordinate onto the first image; and determine the multi-view consistency cycle loss across the first image, the second image, and the third image comprising the third view of the object based on a pixel difference between the sampled pixel location of the first image and the third projected pixel location of the first image.

17. The system as recited in claim 10, wherein the one or more servers further cause the system to determine the first projected pixel location of the second image by projecting the first three-dimensional coordinate onto the second image using a camera pose associated with the second image.

18. A computer-implemented method comprising:

identifying a first image comprising a first view of an object and a second image comprising a second view of the object;

performing a step for determining a multi-view consistency cycle loss across the first image and the second image using an estimated three-dimensional object mesh for the object; and modifying one or more parameters of a pixel mapping neural network to reduce the multi-view cycle consistency loss.

19. The computer-implemented method as recited in claim 18, further comprising generating the estimated three-dimensional object mesh for the object using a surface generation neural network.

20. The computer-implemented method as recited in claim 18, further comprising modifying, in connection with the one or more parameters of the pixel mapping neural network, a latent vector used by a surface generation neural network to generate the estimated three-dimensional object mesh to reduce the multi-view cycle consistency loss.

* * * * *